United States Patent [19]

Reid et al.

[11] 4,311,043
[45] Jan. 19, 1982

[54] METHOD AND APPARATUS FOR DETECTING AIR IN FUEL

[75] Inventors: David L. Reid; Dennis O. Taylor, both of Columbus, Ind.

[73] Assignee: Cummins Engine Company, Inc., Columbus, Ind.

[21] Appl. No.: 46,914

[22] Filed: Jun. 11, 1979

[51] Int. Cl.³ .......................................... G01M 15/00
[52] U.S. Cl. ................................................. 73/119 A
[58] Field of Search ...................... 73/119 A, 118, 116; 364/431, 551

[56] References Cited

U.S. PATENT DOCUMENTS 4,055,995 11/1977 Armstrong et al. ................... 73/116
4,061,026 12/1977 Goodfriend et al. ................. 73/116

FOREIGN PATENT DOCUMENTS 1482304 8/1977 United Kingdom .
1535919 12/1978 United Kingdom .

Primary Examiner—Jerry W. Myracle
Attorney, Agent, or Firm—Merriam, Marshall & Bicknell

[57] ABSTRACT

This disclosure relates to detection of air in the fuel supply system of an internal combustion engine of the character wherein the fuel rate supplied to the engine is controlled by regulating the feed pressure to a set of fuel injectors. A pressure sensor is connected in the fuel supply system and an engine speed sensor is connected to the engine. The engine is started, brought to a stable intermediate no-load speed, the throttle is snapped to a wide open position, and the rate of change of fuel pressure with time is sensed during the initial pressure rise from no load pressure to full load pressure. This measured rate is compared with a reference rate obtained from an engine where no air is present in the fuel system, and the pressure of air is indicated by a comparison of the measured and reference rates.

7 Claims, 6 Drawing Figures

FIG_1
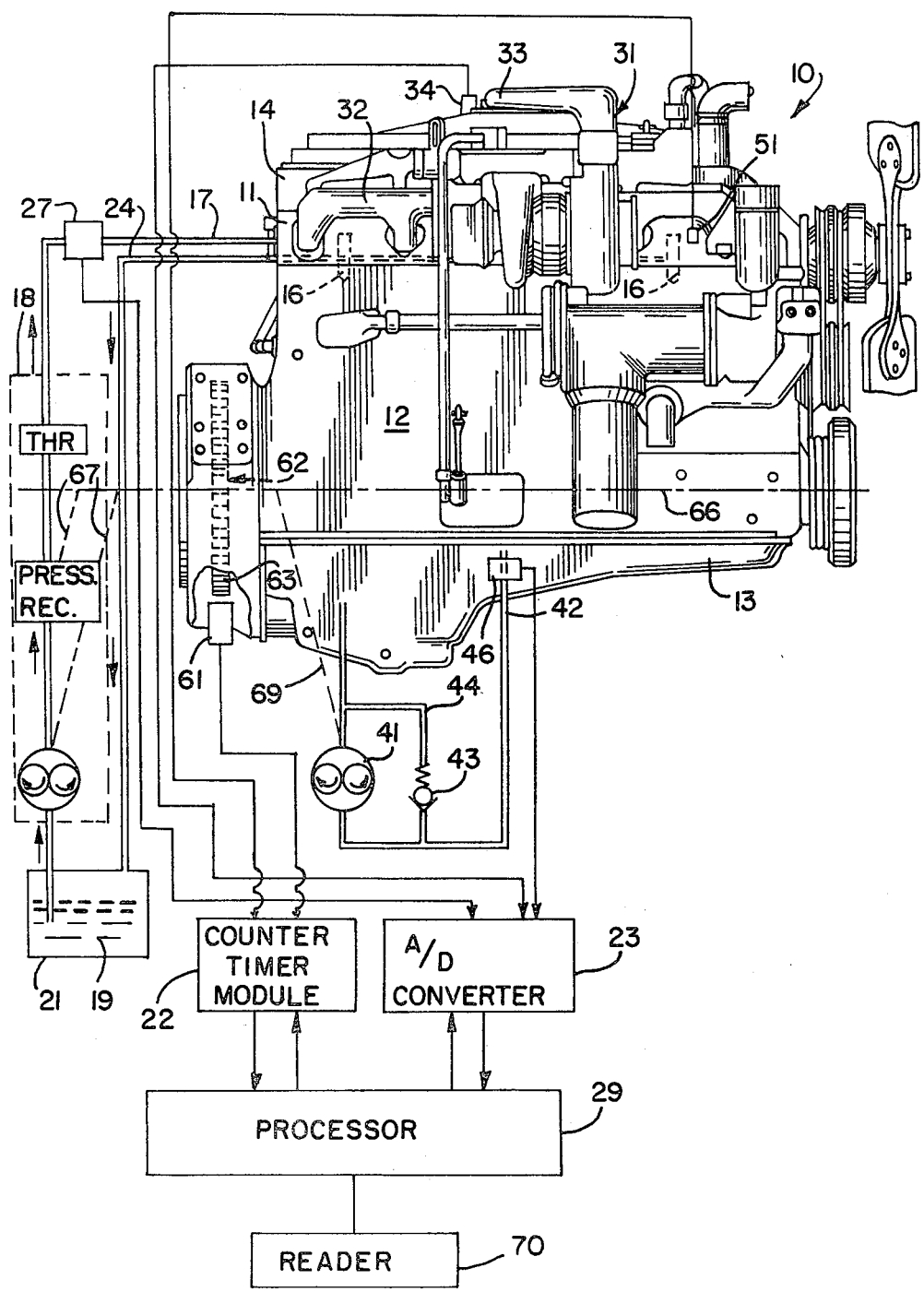

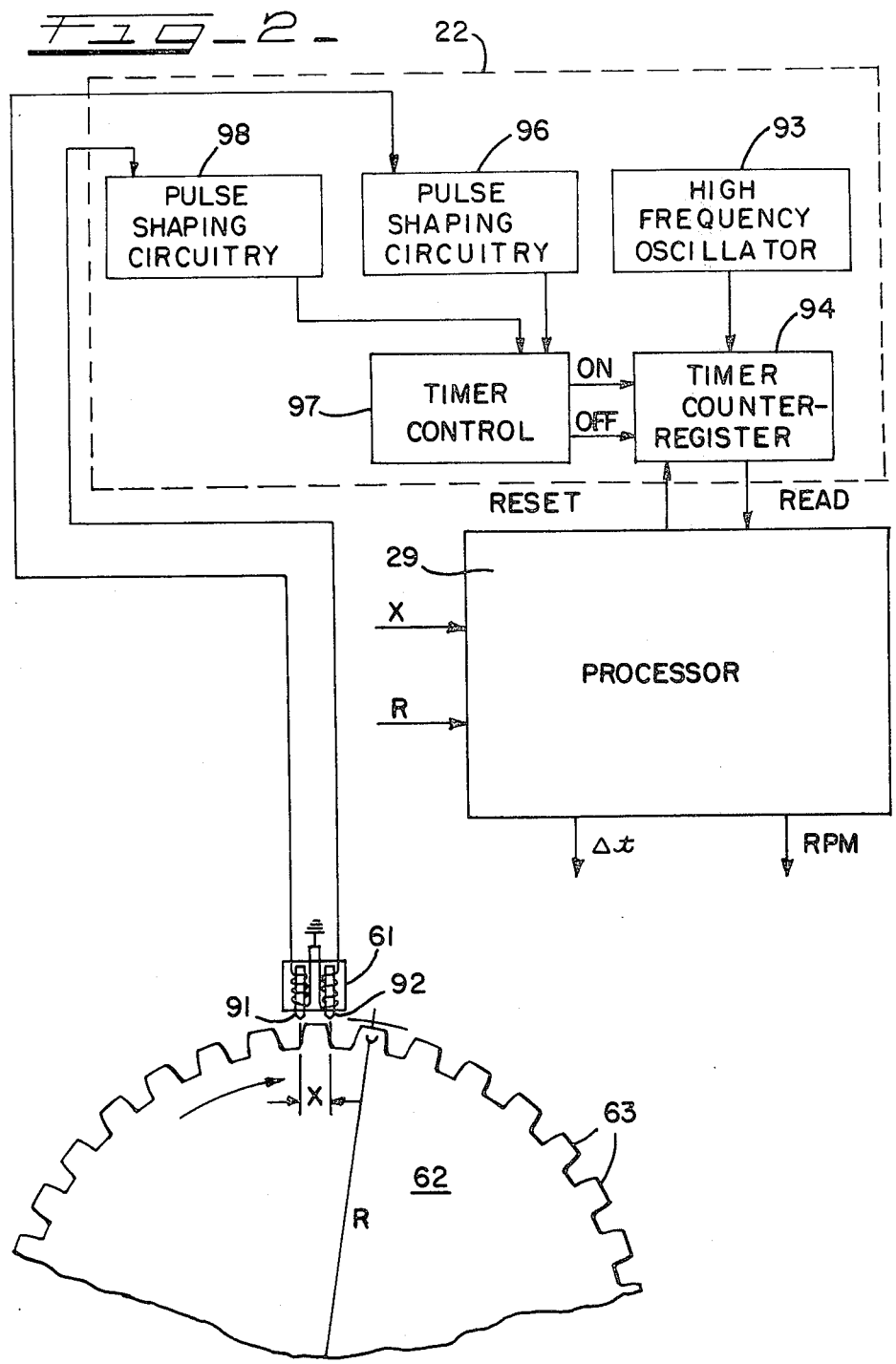

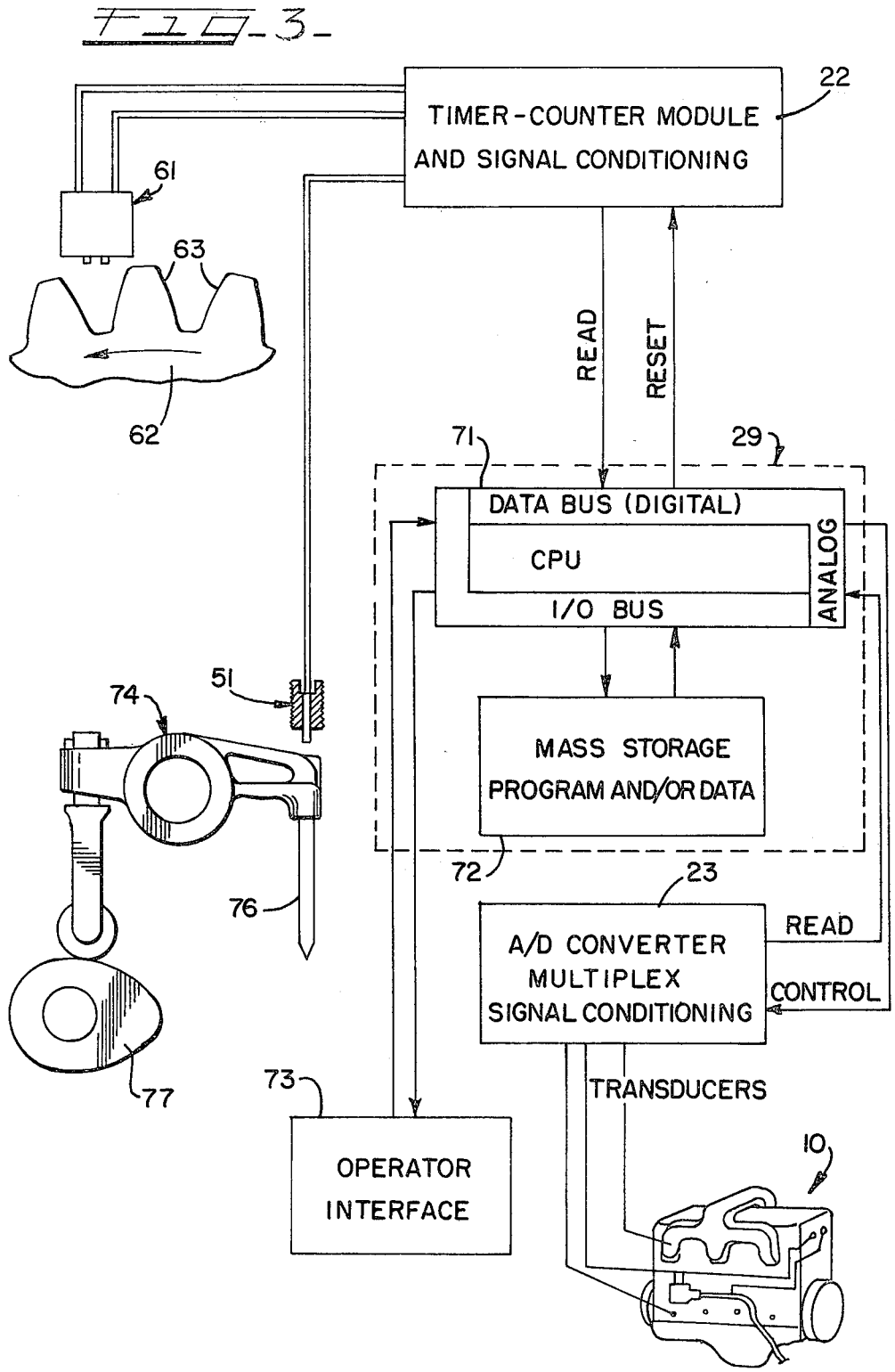

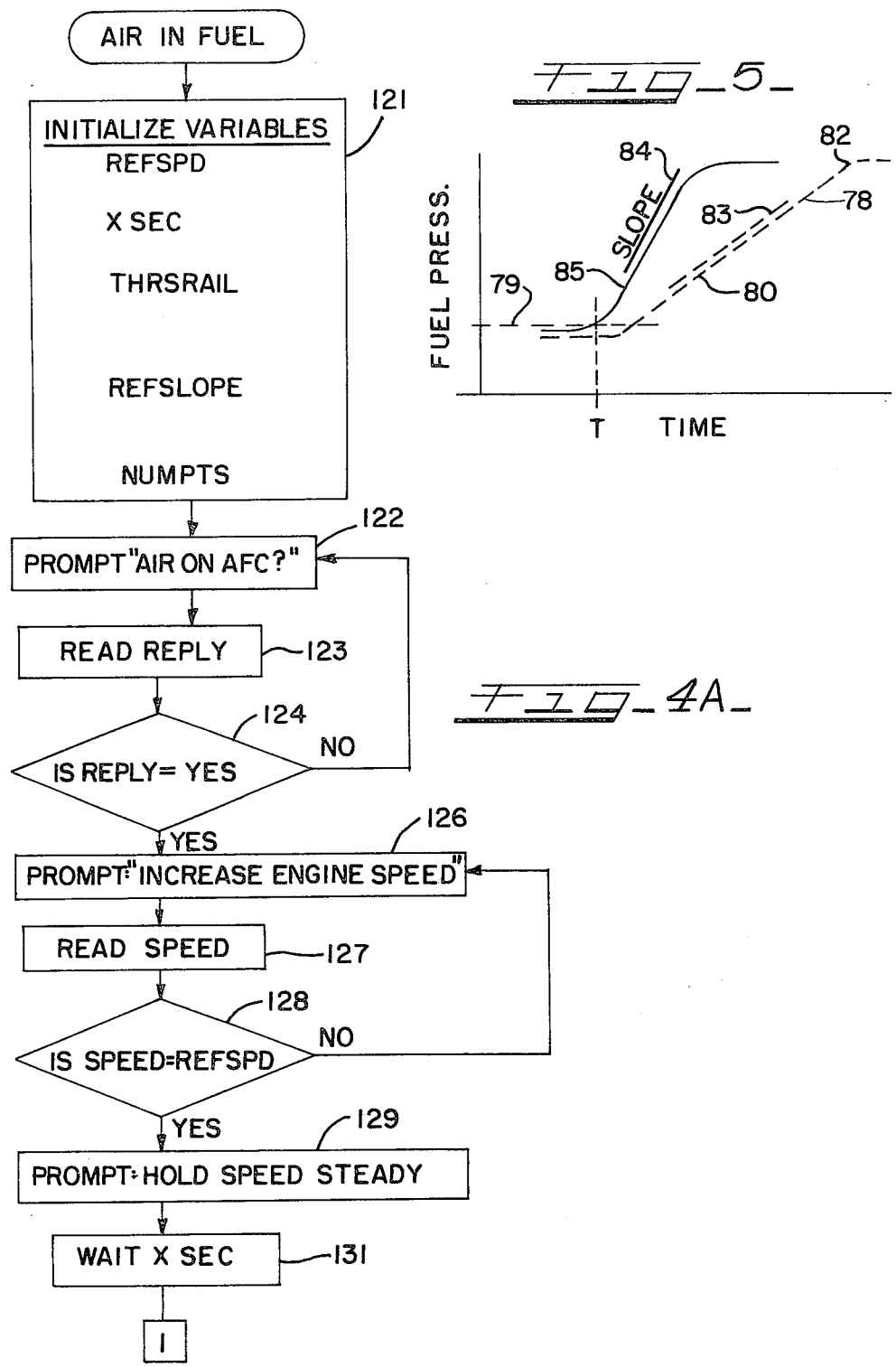

METHOD AND APPARATUS FOR DETECTING AIR IN FUEL

In a conventional multicylinder diesel engine, fuel injectors are provided to inject fuel into the engine combustion chambers. In an engine including unit injectors, a fuel supply rail conducts fuel to the injectors and cam drive mechanisms connected to the injectors actuate the injectors at the appropriate times in each engine cycle. A fuel pump driven from the engine crankshaft draws fuel from the supply tank and delivers it to the supply rail.

A problem encountered in systems of this type arises from air in the fuel supply system. Air may get into the system through, for example, defection pump seals or loose fuel line fittings, and the air tends to accumulate at certain locations when the engine is idling. Air may be drawn into the system on the suction side of the pump and it may accumulate adjacent the pump outlet. Accumulation of air is undesirable because the air becomes entrained in the fuel, resulting in a lower mass of fuel in each injector charge and impaired engine performance. More importantly, in a fuel supply system of the character described in U.S. Pat. No. 3,159,152, the fuel charge, and therefore the power output, is controlled by adjusting the fuel pressure in the supply rail, and air in the fuel is especially disadvantageous. The air is of course compressible, thereby making the engine response "soft".

U.S. Pat. Nos. 4,061,025, 4,061,026 and 4,055,995 describes prior art systems for testing fuel systems for the presence of air. In the method described in U.S. Pat. No. 4,055,995, the engine is adjusted to no-load idle condition and then the throttle is snapped to full open, and the acceleration time for the engine to reach maximum governed speed is measured. This procedure is repeated within a short time, and the measured acceleration times are compared. If air is present in the system, the engine will accelerate faster on succeeding runs because, by then, most or all of the air will have been removed by the rush of fuel during the first acceleration run. In the systems of the other two patents, pressure measurements are taken at a number of preset engine speeds.

The foregoing methods are disadvantageous because a number of the acceleration runs are required. Further, the tests are unreliable because a factor other than air in the fuel system could affect the test results.

It is therefore, a general object of the present invention to provide an improved method and apparatus for detecting air in a fuel system, which is not subject to the foregoing disadvantages.

A method in accordance with the present invention comprises the steps of starting and bringing an engine to a given steady speed, subsequently snapping the throttle open, sensing the fuel pressure in the fuel supply system when the throttle is snapped open, determining the rate of change of the pressure after the throttle is snapped open, and comparing this rate of change with a reference rate derived from the same or a similar engine when it is known that no air is present.

Apparatus in accordance with the invention comprises means to carry out the foregoing method.

The foregoing and other objects and advantages of the present invention will be better understood from the following detailed description taken in conjunction with the accompanying figures of the drawings, wherein:

FIG. 1 is a view of an engine including a system in accordance with the present invention.

FIG. 2 is a block diagram showing a part of the system;

FIG. 3 is a block diagram of the system;

FIGS. 4A and 4B show a flow chart of the operation of the system; and

FIG. 5 is a curve illustrating the operation of the system.

DETAILED DESCRIPTION

Figure 4B:
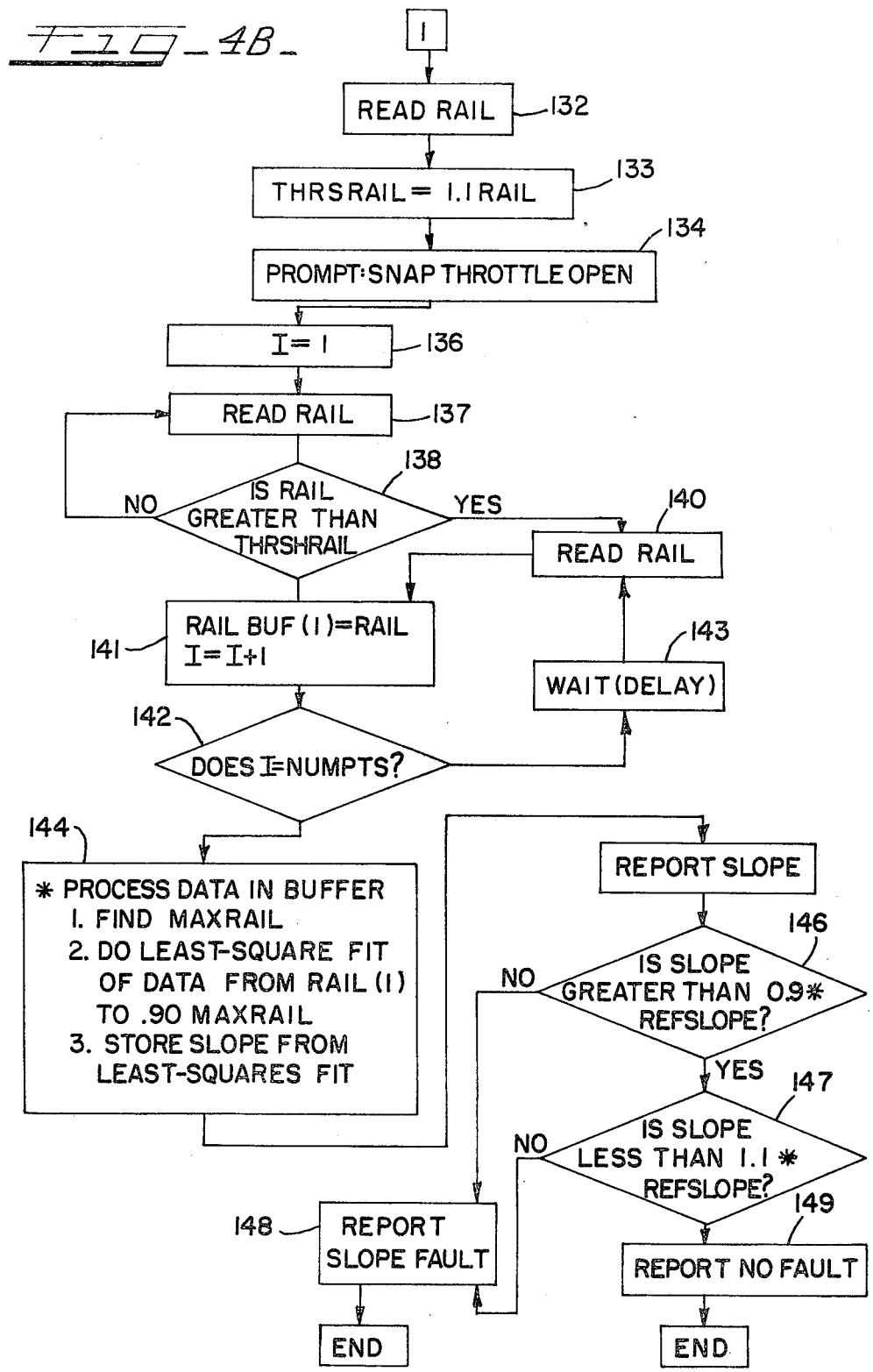

With reference to FIG. 1, an engine 10 is illustrated which may be a standard internal combustion engine such as the NH series, six cylinder, in-line reciprocating piston, diesel engine manufactured by Cummins Engine Company, Inc. Such an engine includes a head 11, a block 12, an oil pan 13 and a rocker housing 14 fastened to the upper side of the head 11. The pistons (not shown) of the engine reciprocate within cylinders (also not shown) and are connected to rotate a crankshaft 66. A flywheel on the crankshaft has a ring gear 62 attached to it, teeth 63 on the gear 62 being selectively engaged by a starter motor (not shown) for starting the engine.

A plurality of fuel injectors 16 inject metered quantities of fuel into the cylinders after inlet air within the cylinders has been compressed sufficiently to cause compression ignition of the resultant combustible mixture. The injectors 16 may be a unit type embodying the features of the injectors shown in U.S. Pat. No. 3,351,288. A common fuel supply rail 17 connects the injectors 16 with a fuel supply system including a fuel pump 18 of the character shown in the U.S. Pat. No. 3,139,875. The fuel pump 18 draws fuel 19 from a reservoir or fuel tank 21 and forms a regulated fuel source for the fuel supplied to the rail 17. A throttle is incorporated in the fuel pump 18 and permits the operator of the engine to regulate the fuel pressure delivered to the injectors in order to control power and speed. Also connected to each of the injectors 16 is a fuel return rail 24 which carries fuel from the injectors 16 to the tank 21.

The engine 10 further includes a turbocharger unit 31 which may have a conventional design. The unit 31 includes a turbine that receives engine exhaust from an exhaust manifold 32 and it further includes a compressor that is connected by a duct 33 to an air intake manifold of the engine.

The engine 10 further includes a lubricant system for circulating a lubricant such as oil through the various operating parts of the engine. The lubricant system includes a pump 41 that draws the lubricant from a reservoir in the crankcase and pan 13 and pumps the lubricant under pressure on a lubricant rifle passage 42 in the block. The pressure in the rifle 42 is regulated by a pressure regulator valve 43 connected in a bypass line 44 that is connected across the pump 41.

A number of mechanical couplings, illustrated by dashed lines in FIG. 1 and indicated by the reference numerals 67 and 69, connect the crankshaft 66 with the fuel pump 18 and the lubricant pump 41, respectively.

A diagnostic system in accordance with the present invention is provided, and includes a cycle event marker (CEM) sensor 51 which is preferably mounted in the rocker housing 14 and responds to the movement of an operating part of the engine. For example, the CEM sensor 51 may be a magnetic coil proximity type sensor that is mounted adjacent the rocker arm that actuates the injector 16 of the number one cylinder.

This rocker arm pivots during injection which occurs toward the end of the compression stroke of the piston of the number one cylinder and this movement causes the sensor 51 to generate a CEM signal toward the end of the compression stroke of the piston of the number one cylinder. The CEM signal is utilized in testing engine parameters as will be subsequently described.

The diagnostic system still further includes an engine speed sensor 61 that is mounted adjacent to the outer periphery of the flywheel ring gear 62 of the engine 10. FIG. 2 illustrates an example of the sensor 61 and the circuits connected to it. The sensor 61 has two spaced elements 91 and 92 which in the present specific example, are variable reluctance magnetic sensors. The teeth 63, moving clockwise, generate signals first in the element 91 and then in the element 92. An oscillator 93 is connected to a counter 94 which is controlled by the tooth pulses from the elements. A pulse from the element 91 operates through circuits 96 and 97 to enable or start the counter 94 and a pulse from the element 92 operates through circuits 98 and 97 to disable or stop the counter. The count associated with each tooth is read by a processor 29. Each count is directly proportional to the time interval ($\Delta t$) for a tooth to move from one element 91 to the other element 92, and inversely proportional to instantaneous speed of the ring gear. A factor for converting counts read to engine RPM may be provided as an input to the processor 29 based on physical measurements, such as the spacing X between the elements 91 and 92 and the radius R of the elements 91 and 92 or may be computed within the processor based on signals from the cycle event marker.

The diagnostic system further includes a number of engine sensors including a fuel pressure sensor 27 connected in the rail 17, a lubricant pressure sensor 46 connected in the rifle passage 42, and an intake manifold air pressure sensor 34 connected in the intake manifold. The sensors 51 and 61 are connected to a counter-timer module 22 and the sensors 27, 34 and 46 are connected to an A/D converter 23, the components 22 and 23 being connected to the processor 29. The processor 29 provides outputs to a readout device 70 which may provide, for example, visual indications and permanent records.

FIG. 3 illustrates the diagnostic system in greater detail. The processor 29 includes a processing unit 71 and a memory unit 72. An operator interface 73 is connected to the unit 71 and forms means whereby the operator may insert information and instructions and includes the readout 70. The diagnostic system utilizes the previously mentioned CEM sensor 51 which is shown mounted in a position to sense the movement of a rocker arm 74 for an injector plunger 76. A cam 77 moves the plunger 76 in an injection stroke toward the end of the compression stroke.

The components 22, 23, 29 and 73 may comprise, for example, standard products of Texas Instruments Company.

As previously mentioned, the present test apparatus is especially suited for use with a fuel supply system of the character described in U.S. Pat. No. 3,139,875 wherein the fuel pressure is regulated to control the engine power output. As the fuel pressure in the supply rail increases, the amount of fuel injected in each engine cycle increases and the engine speed increases under no load conditions.

With reference to FIG. 5, the dashed line curve 78 represents the variation of fuel pressure with time of such a fuel system having a substantial amount of air in it, during a snap throttle opening. At time T the throttle in the pump 18 is snapped full open. When the throttle is snapped full open, the fuel pressure in the supply rail line will increase on a steep ramp from the pressure required at no load to the maximum pressure available at the particular engine speed existent when the test was initiated. In order to increase this pressure ramp, the test is initiated when the engine speed is faster than the normal idle speed, usually 1500 RPM. Additionally, if a device is installed on the engine to limit fueling in response to reduced intake manifold pressures, it is defeated.

As will be described, the slope 83 of the straight portion 80 is determined and the slope 83 is compared with the slope 84 of another curve 85 produced by an engine having no air in the fuel system. Thus, the slope 84 and the curve 85 are employed as reference or comparison values. The low slope of the curve 83, as compared to the slope 84, indicates air in the fuel system because the rate of increase of fuel pressure rise is lower.

The fuel pressure sensor 27 may be a type that produces an analog signal, such as a DC voltage, having a value that is a function of the pressure. The converter 23 converts the analog signal to a digital signal which is passed to the processor 29.

The processor 29 shown in FIGS. 1 and 3 processes the information received from the sensors and from the operator in accordance with the invention. The processor may be a general purpose computer programmed to automatically perform the method and FIGS. 4A and 4B show a flow chart illustrating a specific example of the method and the operation. It should be understood that the invention is not limited to this specific example, which is merely to facilitate the description of the invention. At steps 121 of the flow chart, the following system variables are set: REFSPD which is the engine speed corresponding to the pressure level 79 when the test begins such as 1500 to 1600 rpm; THRSRAIL which is the threshold value of rail pressure at which data acquisition begins, and is equal to 1.1 times the no load rail pressure at RSFSPD;REFSLOPE which is a nominal or reference value of the slope expected for no air-in-fuel; NUMPTS which is the number of samples to be taken; and XSEC which is a delay time to permit any air to accumulate.

After the above variables are inserted, the method proceeds to step 122 wherein the operator is prompted to apply "air to AFC". The prompt may be on a hand-held unit that forms the interface 73. The air fuel control (AFC) bellows is included in some fuel pumps and is a device for limiting the fuel pressure in response to intake manifold pressure. To put air on means that the AFC is set to make no adjustments and acts like a wide open throttle. The operator replies yes or no to this prompt, which is read and processed at steps 123 and 124. At steps 126 the operator is prompted to increase the engine speed which is read at step 127 and compared at step 128 with REFSPD. When the engine reaches REFSPD the operator is prompted to hold the engine speed steady at step 129, and then there is a delay of XSEC at step 131 to allow air to accumulate. At the end of the delay, a reading is taken of the rail pressure at step 132, and at step 33, THRSRAIL is defined as 1.1 times the measured rail pressure. At the next step 134, the operator is prompted to accelerate the engine, and this is at time T in FIG. 5. In step 136, I (used in later steps,) is set at 1. In steps 137 and 138 the rail pressure is read and compared with THRSRAIL to determine whether the throttle has been opened. When the rail pressure exceeds THRSRAIL, the system cycles through loop 140, 141, 142 and 143 until I has incremented to NUMPTS, starting from 1. At step 143, there is a short time delay between readings. The value of NUMPTS is selected so that there are sufficient data samples to determine the ramp 85 in FIG. 5. The successive pressure readings are stored sequentially in RAILBUF.

At step 144, the readings are processed to determine the maximum pressure value (MAXRAIL), and the readings between the first and 0.9 MAXRAIL are processed by a numerical routine, such as a least-square fit, to determine the curve that best fits the measured data. The slope, or rate of pressure increase, is then determined, the time over which the readings are taken being known from the known number of readings and the known time delay 143 between readings. In step 146 the measured slope is compared with REFSLOPE, which, of course, is the line 84 in FIG. 5. If the measured slope is less than 0.9 of REFSLOPE, a fault is reported at step 148, but if the measured slope is above this limit, a no fault condition is indicated at step 149.

The system and method described herein are preferably included with a number of other tests performed on various engine parameters, utilizing the sensors described in connection with FIG. 1.

It will be apparent from the foregoing that a new and useful test system has been provided. The system tests the fuel supply during controlled and repeatable conditions, and an accurate test is performed in only a single acceleration run of the engine.

We claim:

1. The method of testing the fuel supply system of an engine with the aid of a processor, the fuel supply system including a plurality of injectors, a fuel supply pump driven by the engine, and a supply rail connecting the pump with the injectors, the pump including a throttle for controlling the fuel pressure in the supply rail, said method comprising the steps of providing said processor with a reference slope of the variation in fuel pressure with time for a reference fuel supply system, sensing the fuel pressure in the supply rail of a system under test, rapidly opening the fuel throttle to increase the rail pressure, measuring said fuel pressure after said rapid throttle opening and after a plurality of time intervals, computing from said measurements the slope of pressure increase with time, and comparing said computed slope with said reference slope.

2. The method of claim 1, and further including the step of calculating whether said measured slope is within a predetermined percent of said reference slope.

3. The method of claim 1, and further including the step of operating said engine at a steady reference speed before said step of rapidly opening said fuel throttle.

4. The method of claim 1, wherein said reference speed is higher than normal idle speed.

5. The method of claim 1, wherein said computed slope is based on measurements taken at less than the maximum governed pressure.

6. Apparatus for testing the fuel supply system of an internal combustion engine including a plurality of fuel injectors, a fuel pump driven by the engine, and a supply rail connecting the pump with the injectors, the pump including a throttle for controlling the fuel pressure in the supply rail, comprising fuel pressure sensing means for sensing the pressure in said supply rail of a system under test, throttle means for rapidly increasing rail pressure, means for recording said rail pressure after a plurality of time intervals and means for determining the rate of pressure increase with time during and after said throttle opening.

7. Apparatus as in claim 6, wherein said processing means further includes means for comparing said rate with a reference rate.

* * * * *